Sept. 3, 1957 G. F. E. LOECK 2,804,802
ERECTING EYEPIECE AFFORDING VARIABLE MAGNIFICATION
Filed Nov. 7, 1952 2 Sheets-Sheet 1
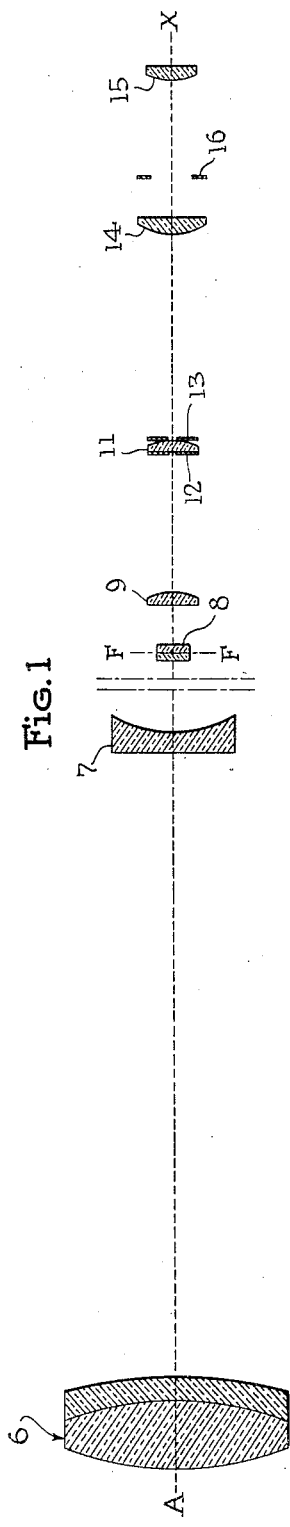
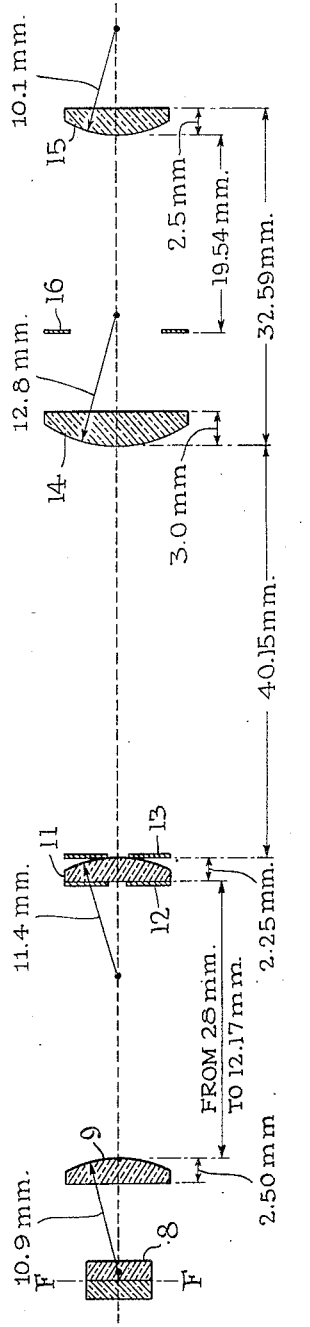
INVENTOR
Günther F. E. Loeck
BY
ATTORNEYS Sept. 3, 1957 G. F. E. LOECK 2,804,802
ERECTING EYEPIECE AFFORDING VARIABLE MAGNIFICATION
Filed Nov. 7, 1952 2 Sheets-Sheet 2

INVENTOR
Günther F.E.Loeck

BY

ATTORNEYS

United States Patent Office 2,804,802
Patented Sept. 3, 1957

2,804,802

ERECTING EYEPIECE AFFORDING VARIABLE MAGNIFICATION

Günther F. E. Loeck, Troy, N. Y., assignor to W. & L. E. Gurley, Troy, N. Y., a corporation of New York Application November 7, 1952, Serial No. 319,220

4 Claims. (Cl. 88—32)

This invention relates to surveying instruments and the like and provides an erecting eyepiece affording variable magnification.

The system in its preferred embodiment comprises four lenses each of which may be planoconvex and all of which are composed of the same optical glass. Three of the lenses and all the diaphragms, three of which are used, are fixed relatively to each other and are movable relatively to the fourth lens to change the magnification and the focal length. All four when adjusted for the desired magnification are shiftable as a unit for focusing purposes.

The mechanical requirements for the two adjustments can be met in a self-contained adjusting mount including a rotary focusing ring with helical cam which moves the external one of two telescoping tubes. This carries the fourth lens and also supports the internal telescoping tube which carries the three other lenses and the diaphragms. The internal telescoping tube is shiftable manually between limits to select the desired magnification.

The external one of the two telescoping tubes is mounted in a tubular guide which could be supported in various specifically different ways but is here shown sustained by a centering mount, developed by the applicant's assignee but not the invention of this applicant.

A preferred embodiment suited for use in surveyors' levels and shown in the accompanying drawings, will now be described. All statements of direction refer to the system as positioned on Figure 1. All dimensions are in millimeters.

Figure 1 is a diagrammatic axial section of the complete optical system of the telescope.

Figure 2 is a similar diagram of the ocular system and the reticle as shown in Fig. 1, but drawn on a larger scale, and dimensioned to disclose in detail one specific successful example.

Figure 3:
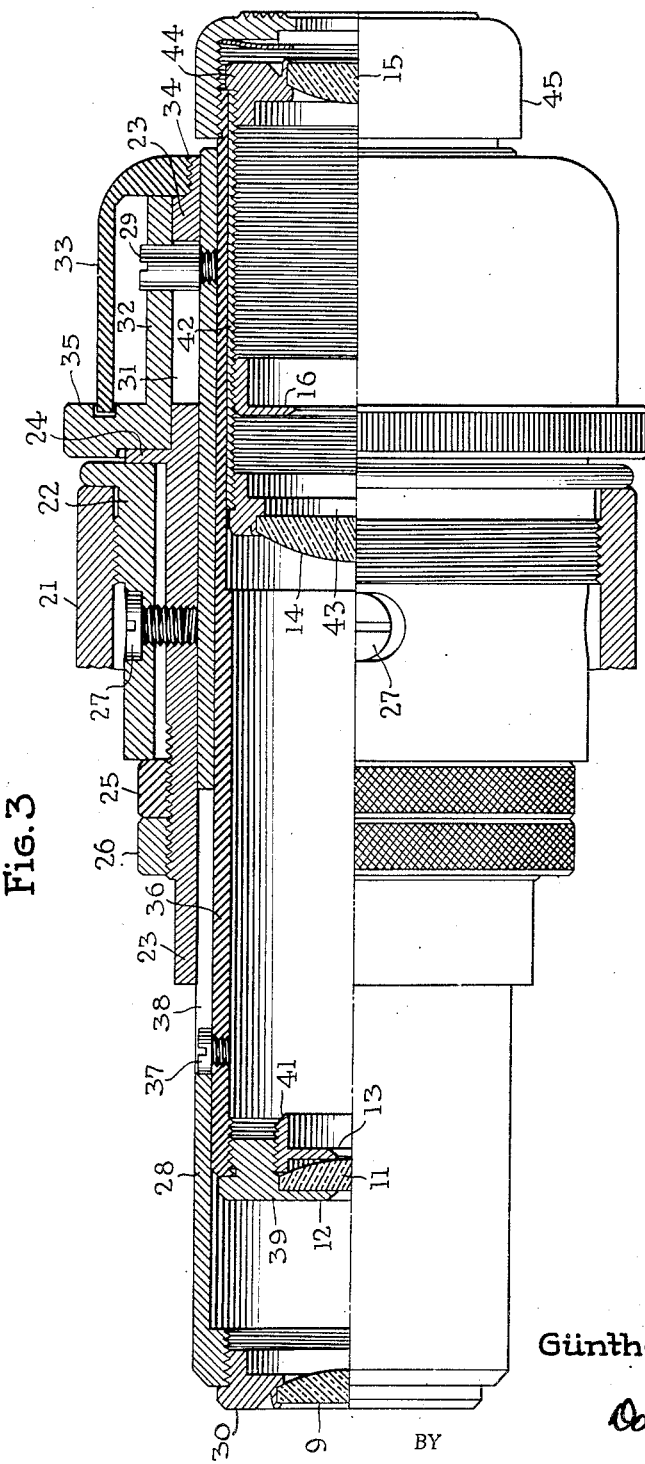
Figure 3 is a view on an enlarged scale showing half in section and half in elevation a completely self-contained eyepiece availing of the advantages of the invention.

All the lenses in the system are mounted on a common optical axis A—X.

The objective lens system of the telescope, shown only in Fig. 1, is conventional and includes the positive doublet 6 and the negative lens 7 which project a real image on the focal plane F—F in which plane the reticle 8 (with cover glass) is positioned. The eyepiece which is the subject of the present invention affords progressive adjustment of magnification of this image and of the reticle. In the example illustrated in Fig. 2, and with the range of adjustment there indicated, the range of magnification is from 15.6 × to 25 ×.

The ocular lens system comprises four lenses spaced on a common optical axis, namely a planoconvex lens 9, hereinafter called the first erector lens component, a planoconvex lens 11, hereinafter called the second erector lens component, with two diaphragms, a front diaphragm 12 and a back diaphragm 13, a planoconvex lens 14, hereinafter called the field lens component of the ocular, and a planoconvex lens 15, hereinafter called the eye-lens component, which last is nearest the observer's eye. Between lenses 14 and 15 is a diaphragm 16, placed at the focal plane of the lens 15. The lenses 14 and 15 and the diaphragm 16 will be readily recognized as comprising a Huygenian eyepiece. The lenses 9 and 11 are the erecting system and as illustrated, the system obviously is not symmetrical.

By means, later to be described, the lenses 11, 14 and 15 and the diaphragms 12, 13 and 16 are fixedly mounted relatively to one another, and are movable along the optical axis A—X as a unit relatively to lens 9 so as to change the air space between said unit and lens 9. The effect is to change the focal length of, and the magnification afforded by, the ocular lens system. Fig. 2 of the drawings suggests as limits for the air space between lenses 9 and 11, the dimentions 28 mm. and 12.17 mm. This range is sufficient for surveying instruments.

To accommodate the interval between the focal plane F—F and lens 9 to the selected focal length of the ocular system, means are provided to move the entire ocular system (parts 9–16 inclusive) as a unit along the optical axis. This is the focusing adjustment, and is made after adjustment for selecting magnification has been made.

Simply as an example, and without intending to limit the invention to a particular one of many possible embodiments, the radii of curvature and thickness of the lenses and the air spaces between lenses are indicated on Fig. 2 in millimeters. The apertures of diaphragms 12, 13 and 16 in this illustrative embodiment are 1.8 mm., 2.0 mm. and 9.0 mm. The optical glass used for each of the four lenses 9, 11, 14 and 15 is boro-silicate crown, $n_D = 1.517$, $V = 64.5$.

An ocular system as above defined and other optically similar systems are mounted according to the invention as shown in Figure 3.

In that figure 21 is the telescope tube in which are mounted the objective lenses 6 and 7 and the reticle 8, all according to know practice. A flanged tube 22 is threaded into the end of tube 21 and serves as the mount on which the eyepiece is mounted adjustably, so that it can be moved transversely to the tube 21 and fixed in adjusted position.

The parts are so constructed that the optical axis of the objective lens system 6, 7 and the optical axis of the lens system 9, 11, 14, 15 are each normal to the end planes of tube 22. The transverse adjustment just mentioned serves to bring these axes into coincidence affording the desired common optical axis A—X.

An adjustable guiding tube 23 has a fixed external flange 24 and an adjustable external flange afforded by the ring 25 threaded on tube 23 and locked by threaded jam ring 26. The flanges on tube 23 closely embrace the ends of tube 22 but do not clamp the parts. Adjustment is effected by turning four radial screws 27 which pass through slots in tube 22 and are threaded into tube 23.

An outer telescoping tube 28 is longitudinally slidable in tube 23 and carries a stud 29 which is threaded into tube 28 and extends through a longitudinal slot 31 in tube 23 into a helical slot in focusing sleeve 32. Sleeve 32 is swiveled on tube 23 between the right side of flange 24 and a cup shaped shield 33 threaded at 34 on the right end of tube 23. Sleeve 32 has a knurled flange 35 by which it may be turned manually for focusing purposes. Turning of flange 35 causes axial motion of tube 28 in guide tube 23, for slot 31 holds stud 29 against rotary motion while permitting longitudinal motion cause by its engagement with the helical slot in sleeve 32.

Lens 9 is supported by mount 30 screwed into the end of tube 28.

An inner telescopic tube 36 is axially slidable in tube 28 and is held against rotation therein by screw 37 whose head engages the longitudinal slot 38 in tube 28, the screw being mounted in tube 36.

A two part mount 39, 41 is threaded into the left end of tube 36, supports the lens 11 and includes the diaphragms 12 and 13.

The right hand end portion of tube 36 is counterbored to receive a sub-assembly comprising an internally threaded tube 42 into whose opposite ends are screwed a lens mount 43 carrying lens 14 and a lens mount 44 carrying lens 15. The diaphragm 16 takes the form of a flanged disc threaded into tube 42. This permits lenses 14, 15 and diaphragm 16 to be adjusted as a sub-assembly, and then adjusted as a group relatively to lens 11. This occurs during manufacture but the adjustment is fixed during use.

A cup shaped ring 45 is threaded onto the end of tube 36 and may be grasped to slide tube 36 longitudinally in tube 28. This is the adjustment which changes magnification and moves as a unit all three lenses 11, 14 and 15 and all three diaphragms.

The eyepiece is self contained, and simple to manufacture, and affords adjustments for magnification and for focus, neither of which affects the setting of the instrument in any other respect.

While one embodiment has been described in great detail, modification within the scope of the claims is contemplated.

What is claimed is:

1. An erecting eyepiece affording progressive adjustment of magnification, comprising in combination four positive lens components arranged on a common optical axis, two of which lens components form an unsymmetrical erecting system comprising a first erector and a second erector and the remaining two of which form an ocular comprising appropriately spaced field lens and eye-lens components; first adjusting means for moving the ocular and said second erector as a unit along the optical axis toward and from said first erector to vary magnification; and second adjusting means for focus serving to move all four lens components as a unit along said optical axis.

2. The combination defined in claim 1 in which the ocular is of the Huygenian type and includes a diaphragm substantially in the focal plane of its eye-lens component.

3. The combination with the structure defined in claim 2 of diaphragm means centered on said optical axis, closely associated with, and mounted to move with said second erector.

4. The combination with the structure defined in claim 1 of diaphragm means centered on said optical axis, closely associated with, and mounted to move with said second erector.

References Cited in the file of this patent

UNITED STATES PATENTS

| | | |
|---|---|---|
| 737,872 | Saegmuller | Sept. 1, 1903 |
| 838,651 | Saegmuller | Dec. 18, 1906 |
| 879,572 | Neumayer | Feb. 18, 1908 |
| 936,541 | Kellner | Oct. 12, 1909 |
| 1,091,933 | Humbrecht | Mar. 31, 1914 |
| 1,130,468 | Bierbrauer et al. | Mar. 2, 1915 |
| 1,167,991 | Grebe | Jan. 11, 1916 |
| 1,395,822 | Hastings | Nov. 1, 1921 |
| 1,427,592 | Hales | Aug. 29, 1922 |
| 2,489,578 | Hillman | Nov. 29, 1949 |

FOREIGN PATENTS

| | | |
|---|---|---|
| 3,876 | Great Britain | of 1815 |
| 7,755 | Great Britain | of 1895 |
| 17,843 | Great Britain | of 1897 |
| 22,766 | Great Britain | of 1914 |
| 299,789 | Germany | Sept. 17, 1919 |